United States Patent [19]

Penda

[11] Patent Number: 5,482,429

[45] Date of Patent: Jan. 9, 1996

[54] FAN BLADE CONTAINMENT ASSEMBLY

[75] Inventor: Allan R. Penda, Amston, Conn.

[73] Assignee: United Technologies Corporation, Hartford, Conn.

[21] Appl. No.: 235,044

[22] Filed: Apr. 29, 1994

[51] Int. Cl.⁶ ............................................. F01D 21/00
[52] U.S. Cl. ........................................... 415/9; 415/119
[58] Field of Search ................... 415/9, 119, 182.1, 415/220

[56] References Cited

U.S. PATENT DOCUMENTS

| | | | |
|---|---|---|---|
| 4,425,080 | 1/1984 | Stanton et al. | 415/9 |
| 4,534,698 | 8/1985 | Tomich | 415/9 |
| 4,801,070 | 1/1989 | Hom et al. | 228/184 |
| 5,160,248 | 11/1992 | Clarke | 415/9 |
| 5,259,724 | 11/1993 | Liston et al. | 415/9 |

Primary Examiner—Edward K. Look
Assistant Examiner—Michael S. Lee

[57] ABSTRACT

A fan blade containment assembly includes a flow surface forward of the fan blades that is defined by the inner surface of the case. Various construction details are developed that provide an axially and circumferentially continuous flow surface forward of the fan blades. The continuity and uniformity eliminates structural discontinuities that increase noise levels associated with the engine. In a particular embodiment, the case is formed from an isogrid structure, a plurality of cloth wraps wound under tension around the case, and a plurality of acoustic panels downstream of the fan blades. The flow surface forward of the fan blades is provided by machining the inner surface of the case to the desired shape.

4 Claims, 2 Drawing Sheets

FAN BLADE CONTAINMENT ASSEMBLY

TECHNICAL FIELD

The present invention relates to containment assemblies for fan blades of aircraft engines.

BACKGROUND OF THE INVENTION

The importance and difficulty associated with fan blade containment has increased with the introduction of larger and more powerful turbofan engines into the aircraft industry. Preventing the escape of a fan blade subsequent to the blade becoming detached from the rotor assembly presents structural, size and weight challenges.

A typical containment assembly includes a rigid cylindrical shell surrounded by a plurality of cloth wraps. The shell or casing is formed from a stiff structural material. The cloth wraps are usually formed from a high strength material, such as KEVLAR (KEVLAR is a registered trademark of Dupont Corporation). A detached fan blade is thrown outward and passes through the case but is caught by the cloth wraps. The cloth wraps deflect in response to the impact but retain the fan blade. The case then provides a bearing surface to support the unbalanced array of fan blades. For shipping and handling considerations, it is desired that the radial profile of the case be as small as possible.

Spaced outward of the case and cloth wraps is the nacelle. The wraps are designed to deflect an amount sufficient to contain the blade but not to permit impact of the blade with the nacelle to prevent damage to the nacelle. The amount of radial spacing required between the wraps and the nacelle contributes to the radial profile of the nacelle. For aerodynamic considerations, it is desirable to have the radial profile of the nacelle be as small as possible. The spacing may be made smaller by increasing the number of wraps but at the cost of adding weight to the containment assembly. The additional weight negatively impacts the operating efficiency of the powerplant. As a result, there is a trade-off between the radial profile of the nacelle and the weight of the containment assembly.

In addition to the case and cloth wraps, the containment assembly also includes a liner defined by a plurality of circumferentially adjacent acoustic panels. The liner extends the length of the case and includes a flow surface that faces inwards towards the array of fan blades. Since the flow surface is non-linear, the liner provides a structure that is easily shaped, as opposed to the case, to form the flow surface.

The acoustic panels are typically a honeycomb type of material that minimize noise levels associated with the fan. Engine noise is another area that has increased in importance in recent years. In this respect, the Environmental Protection Agency issues regulations on the permissible noise levels of aircraft engines.

Unfortunately, providing the necessary amount of acoustic treatment over the inner surface of the case has several drawbacks. First, for a given fan blade length it increases the diameter of the containment assembly and thereby the radial profile of the case and nacelle. Second, it increases the separation between the fan blades and the inner surface of the case which, as described above, acts as a bearing surface in the event of a blade loss. The greater the separation between the fan blades and the bearing surface, the greater the radial movement of the rotor assembly and the higher the risk of further damage to the rotor assembly in the event the rotor assembly becomes unbalanced.

The above art notwithstanding, scientists and engineers under the direction of Applicants' Assignee are working to develop effective containment assemblies that are lightweight and have small radial profiles for aircraft engines.

DISCLOSURE OF THE INVENTION

The present invention is predicated in part upon the recognition that bond joints between adjacent acoustic panels produce a structural discontinuity forward of the array of fan blades. In this region, these discontinuities may scatter acoustic energy into the far field and result in increased noise levels associated with the aircraft engine. Eliminating such discontinuities in the flow surface forward of the fan blades would reduce the amount of acoustic energy radiating into the far field.

According to the present invention, a fan blade containment assembly includes a uniform and continuous flow surface forward of the array of fan blades that is machined from the case surrounding the array of fan blades. The feature of using the inner diameter of the case as the flow surface results in minimizing the outer diameter of the case, which in turn permits the outer diameter of the nacelle to be minimized or the radial separation between the case and nacelle to be maximized. Since the case is used as a portion of the flow surface, there is no longer a need to install panels in this region to provide the flow surface. Eliminating the panels permits the case to be moved radially inward and thereby reduces the outer diameter of the case. The smaller diameter case improves the ability of the engine to be handled and shipped in a conventional fashion. In addition, as a result of the smaller case, either the nacelle may be made smaller in outer diameter or the radial separation may be made larger or a combination of both. The smaller diameter nacelle is significant because of the larger sizes of modern aircraft engines. Reducing the outer diameter of the nacelle improves the aerodynamic characteristics of the nacelle. A larger radial separation between the case and the nacelle permits larger deflections of the cloth wraps used to contain a blade which has separated from the rotor. By permitting greater deflections less wraps may be used and a lighter weight containment assembly results.

Another advantage of the reduced diameter casing is increased support of the rotor after a blade loss occurs. Blade loss produces an imbalance in the rotor and causes the rotor to move radially outward. In this situation, the inner surface of the case acts as a bearing surface that engages the tips of the fan blades to support the rotor. The greater the initial radial separation between the fan blades and the inner surface of the case, the greater the amount of radial movement of the rotor that occurs before the case provides any bearing support. Movement of the rotor away from its longitudinal axis may lead to additional damage to the rotor assembly. Minimizing the amount of radial movement minimizes the likelihood of further damage occurring.

A further advantage of using the machined surface of the inner diameter of the case as the flow surface is the elimination of any structural discontinuities in the surface forward of the array of fan blades. These discontinuities change the character of a portion of the acoustic energy generated by the array of fan blades from a near field wave that does not propagate well into the far field to an acoustic wave that significantly propagates into the far field. A source of these discontinuities in conventional containment assemblies is the joints between adjacent panels. Although the panels are typically provided for their noise reduction benefits, removing the panels and eliminating the discontinuities may result in reduced noise levels.

The foregoing and other objects, features and advantages of the present invention become more apparent in light of the following detailed description of the exemplary embodiments thereof, as illustrated in the accompanying drawings.

BRIEF DESCRIPTION OF THE INVENTION

BEST MODE FOR CARRYING OUT THE INVENTION

Figure 1:
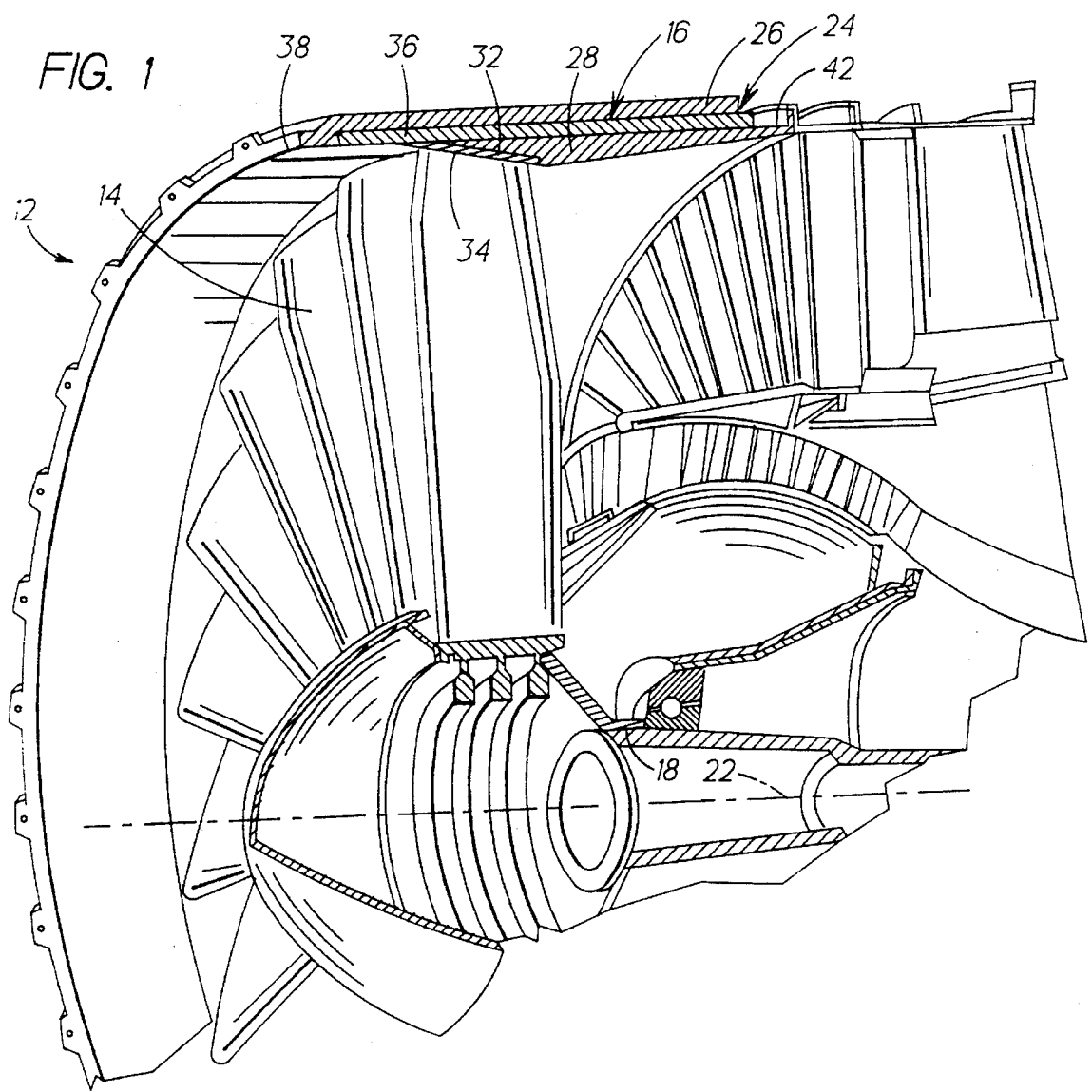
FIG. 1 is a perspective view of a turbofan engine partially cut away to show the containment assembly surrounding an array of fan blades.

Illustrated in FIG. 1 is a large, turbofan engine 12 including an array of fan blades 14 and a containment assembly 16 surrounding the fan blades. The fan blades 14 are part of and attached to a rotor assembly 18 and rotate about the longitudinal axis 22 of the engine 12.

Figure 2:
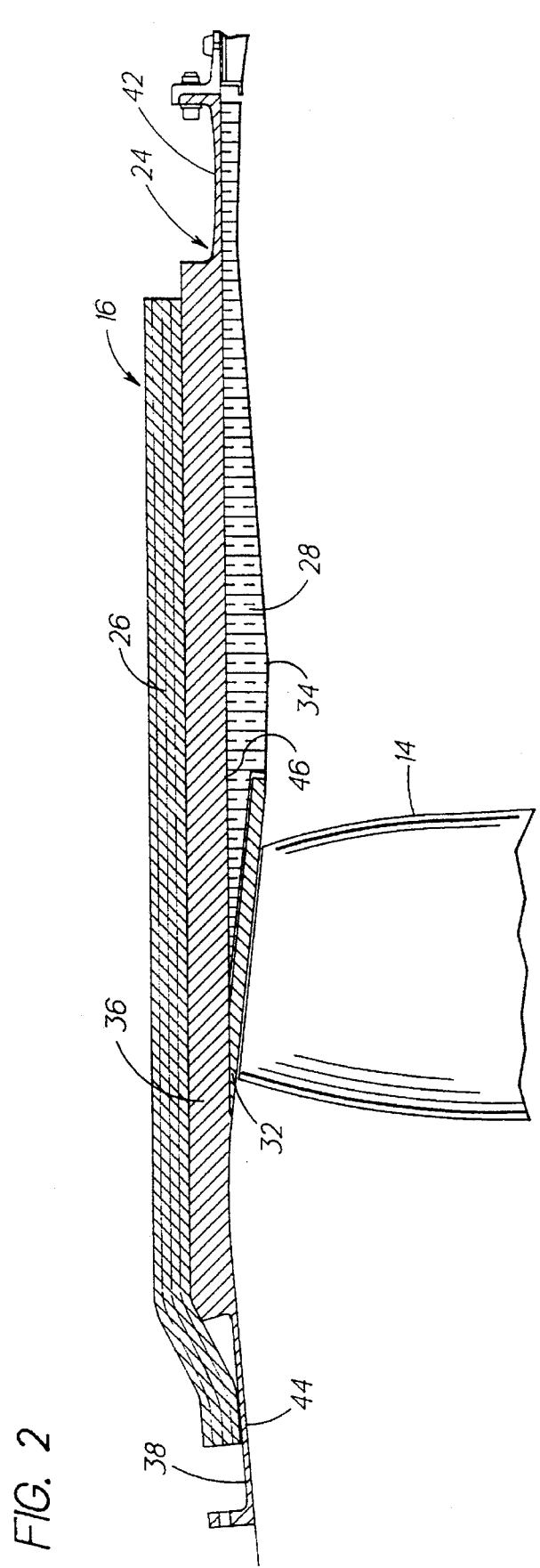
FIG. 2 is a sectional side view of the containment assembly and an adjacent fan blade.

The containment assembly 16, shown more clearly in FIG. 2, includes a case 24, a plurality of cloth wraps 26, a plurality of circumferentially adjacent acoustic panels 28, a plurality of circumferentially adjacent rubstrips 32, and a flow surface 34. The case 24 is of a generally cylindrical shape and has an isogrid stiffened portion 36 extending forward and aft of the fan blades 14. A forward flange 38 and aft flange 42 extend from the isogrid stiffened portion 36. The case 24 forms a rigid structure to support the cloth wraps 26.

The cloth wraps 26 are formed from a high strength material that are wound, under tension, circumferentially about the case 24. A suggested material for the cloth wraps 26 is KEVLAR. The cloth wraps 26 retain a blade that has become detached during operation.

The plurality of acoustic panels 28 extend from the fan blades 14 downstream to the end of the case 24. The acoustic panels 28 define the shape of the flow surface downstream of the blades 14 and are formed from a honeycomb type material that is designed to reduce engine noise. The panels 28 are bonded to the case 24 and there is a bond joint between circumferentially adjacent panels 28. The panels 28 are covered with a perforated sheet that provides the flow surface 34.

The plurality of rubstrips 32 are circumferentially adjacent segments formed from a relatively compliant material. The rubstrips 32 permit the fan blades 14 to be in close proximity to the flow surface 34 immediately outward to minimize the amount of air that flows around the fan blades 14. In the event that the tip of a fan blade makes contact with the rubstrips 32, the compliance of the rubstrips 32 eliminates or minimizes the risk of damage to the fan blade.

The flow surface 44 forward of the array of blades 14 is formed by machining the inner surface 46 of the case 24. The inner surface 46 is machined to produce the amount of curvature desired for the flow surface 44. Since the region forward of the rubstrips 32 typically has minimal curvature, this machining operation may be accomplished without excessive cost.

As a result of having the flow surface 44 forward of the fan blades 14 formed from the inner surface 46 of the case 24, this flow surface 44 is axially and circumferentially continuous and uniform. The lack of structural discontinuities in this region removes one mechanism that generates far field noise associated with the engine 12. In effect, the machined flow surface 44 may reduce noise levels as compared to a prior art containment assembly having a forward flow surface defined by a plurality of segmented acoustic panels with bond joints between adjacent panels.

Although the invention has been shown and described with respect with exemplary embodiments thereof, it should be understood by those skilled in the art that various changes, omissions, and additions may be made thereto, without departing from the spirit and scope of the invention.

What is claimed is:

1. A fan blade containment assembly for an aircraft engine, the aircraft engine including an array of fan blades that are rotatable about a longitudinal axis, the fan blade containment assembly including a casing disposed radially outward of and circumferentially about the array of fan blades, the casing having an inner diameter, at least one acoustic panel attached to said inner diameter of said casing downstream of the array of fan blades, the acoustic panels define a flow surface downstream of the array of blades, a portion of said inner diameter of said casing defining a flow surface forward of the array of fan blades, the flow surface being uniform and continuous in the circumferential and axial directions.

2. The fan blade containment assembly according to claim 1, wherein the casing is formed from an isogrid structure and the flow surface is machined into the isogrid structure.

3. The fan blade containment assembly according to claim 1, further including a plurality of cloth wraps about the outer diameter of the casing, the cloth wraps adapted to prevent a fan blade from escaping in the event of the blade detaches from the array of fan blades.

4. A fan blade containment assembly for an aircraft engine, the aircraft engine including an array of fan blades that are rotatable about a longitudinal axis, the fan blade containment assembly including a casing, a plurality of cloth wraps, a rub strip and a plurality of acoustic panels, the casing being an isogrid structure disposed radially outward of and circumferentially about the array of fan blades, the cloth wraps extending about the outer diameter of the casing, the cloth wraps adapted to prevent a fan blade from escaping in the event of the blade detaches from the array of fan blades, the rub strip disposed in radial proximity to the radially outer tips of the array of fan blades and extending axially forward and aft of the array of fan blades, the acoustic panels attached to the inner diameter of the casing downstream of the array of fan blades, the acoustic panels adapted to reduce the noise levels associated with the aircraft engine, and wherein the flow surface forward of the rub strip is defined by the inner diameter of the casing, wherein the inner diameter of the casing forward of the rub strip is a machined surface such that the forward flow surface is uniform and continuous in the circumferential and axial directions.

* * * * *